United States Patent [19]
Kirchberger

[11] Patent Number: 5,131,143
[45] Date of Patent: Jul. 21, 1992

[54] METHOD OF CENTERING AND THUS BALANCING WORKPIECES TO BE MACHINED ONLY IN PART

[75] Inventor: Peter Kirchberger, Haag, Austria

[73] Assignee: GFM Gesellschaft für Fertigungstechnik und Maschinenbau Aktiengesellschaft, Steyr, Australia

[21] Appl. No.: 726,996

[22] Filed: Jul. 8, 1991

[30] Foreign Application Priority Data

Jul. 13, 1990 [AT] Austria .................................. 1491/90

[51] Int. Cl.$^5$ .............................................. B23K 1/20
[52] U.S. Cl. ................... 39/888.08; 29/601; 29/901; 74/603
[58] Field of Search .............. 29/888.08, 901, 6.01; 74/594.1, 595, 603

[56] References Cited

U.S. PATENT DOCUMENTS

| 3,295,413 | 1/1967 | Castelet ................... 29/901 |
| 3,673,651 | 7/1972 | Stewart ................... 29/901 |
| 4,445,399 | 5/1984 | Sasaki ................... 29/888.08 |
| 4,779,316 | 10/1988 | Cherry et al. ................... 29/888.08 |
| 5,000,141 | 3/1991 | Sugano ................... 29/888.08 |

FOREIGN PATENT DOCUMENTS 0090344  5/1983  Japan ................... 29/888.08

OTHER PUBLICATIONS

"Numerical Control Balances Crankshafts" W. A. Hawkins Metalworking Production, Aug. 1, 1962.

Primary Examiner—Irene Cuda
Attorney, Agent, or Firm—Collard & Roe

[57] ABSTRACT

A method of centering and thus balancing workpieces to be machined only in part comprises a provision of centering bores in and faces of the workpiece and/or a circular machining of peripheral surfaces on which the workpiece is adapted to be gripped. Before the workpiece is machined it is repositioned so that the rotary unbalance of the workpiece is reduced in that the position and/or mass distribution of the workpiece relative to its axis of rotation is changed. The workpiece is subsequently provided with the centering bores and/or with the surfaces to be gripped, which define the balanced and centered position of the workpiece and the associated axis of rotation. To permit a more economical final balancing of the workpiece when it has been machined the required change of the position and/or mass distribution of the workpiece is determined in that in the total rotary unbalance of the workpiece, on the one hand, and the rotary unbalance which is due to those portions of the workpiece which are to be machined, on the other hand, are determined, and that the rotary unbalance which is due to those portions of the workpiece which are intended not to be machined is subsequently determined by a computation from the rotary unbalances which have previously been determined.

1 Claim, 1 Drawing Sheet

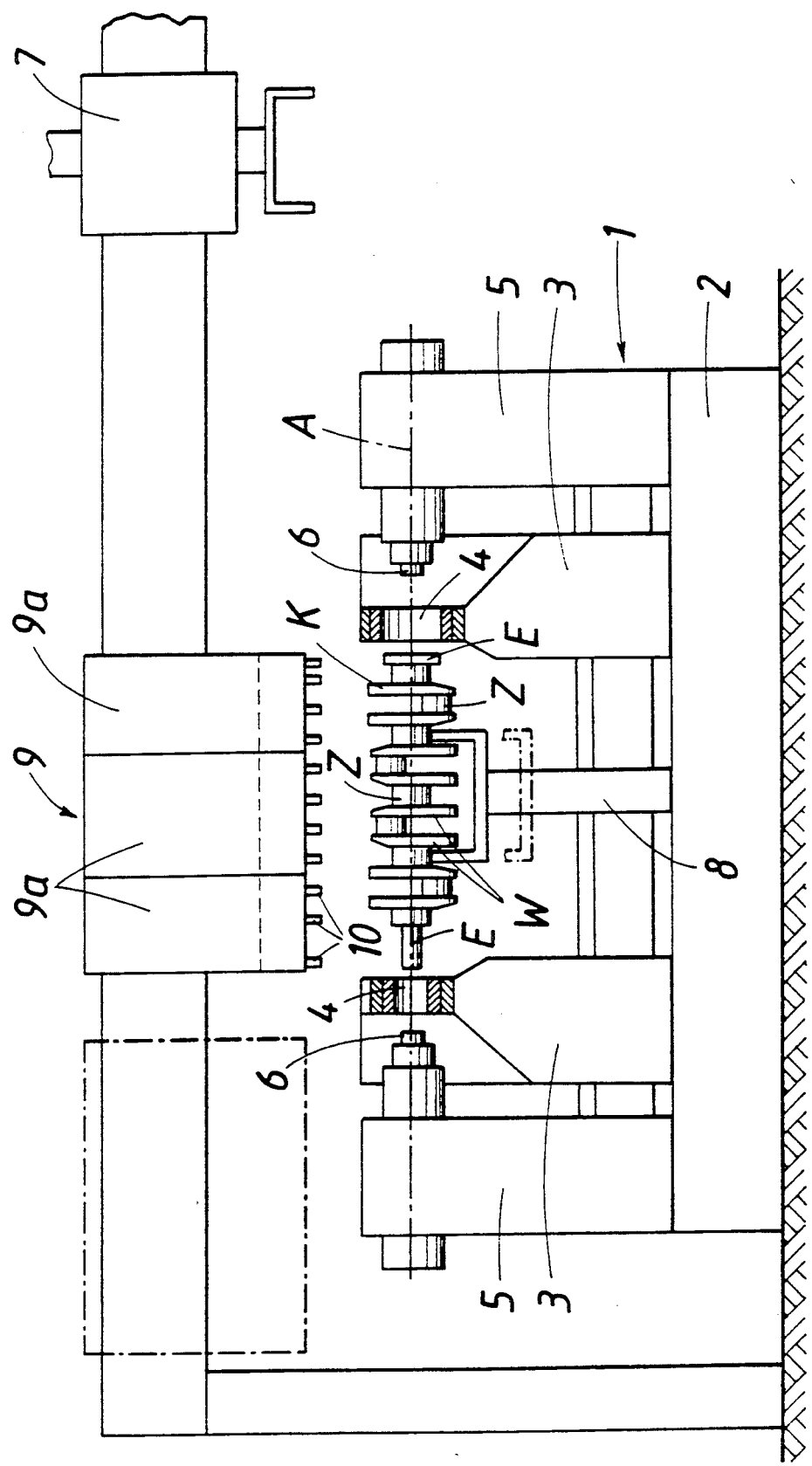

METHOD OF CENTERING AND THUS BALANCING WORKPIECES TO BE MACHINED ONLY IN PART

BACKGROUND OF THE INVENTION

1. Field of the Invention

This invention relates to a method of centering and thus balancing workpieces to be machined only in part, particularly crankshafts, which method comprises a provision of centering bores in end faces of the workpiece and/or a circular machining of peripheral surfaces on which the workpiece is adapted to be gripped, wherein the workpiece before it is machined is repositioned so that the rotary unbalance of the workpiece is reduced in that the position and/or mass distribution of the workpiece relative to its axis of rotation is changed, this is optionally succeeded by a cutting of the workpiece to a predetermined length, the workpiece is subsequently provided with the centering bores and/or with the surfaces to be gripped, which define the balanced and centered position of the workpiece and the associated axis of rotation, and the magnitude and direction of the change of the position and/or mass distribution of the workpiece are determined in consideration only of the rotary unbalances which are due to those portions of the workpiece which are intended not to be machined.

2. Description of the Prior Art

Such a balancing centering has already been proposed in EP-81-0 268 724 and permits a satisfactory balancing of the workpiece to be effected in an economical manner in the course of the manufacture of the workpiece. Because the rotary unbalances which are due to those portions of the workpiece which are to be machined are not taken into account, the axis of rotation which is determined by the centering bores or the surfaces to be gripped will provide after the balancing operation for a rotary unbalance only of those portions of the workpiece which are not intended to be machined so that the final balancing operation which will succeed the machining operation has been preceded by an optimum preliminary balancing operation because the machining of the workpiece will be performed with reference to the axis of rotation which has been determined by the centering operation and will eliminate those rotary unbalances which are due to the those portions of the workpieces which have been machined and, as a result, have a mass distribution which is balanced with reference to the axis of rotation. The final balancing operation may then be restricted to a precision balancing, which can economically be performed and even in workpieces having unmachined portions will ensure a perfectly balanced true running about the axis of rotation which has been established.

To permit a determination of the magnitude and direction of the displacement of the workpiece in the previous practice, the external configurations of those portions of the workpieces which were intended not to be unmachined and were measured and were compared by a computer with the desired shapes of the corresponding portions of an ideal workpiece. But it is rather difficult and complicated to measure the unmachined portions of the workpiece with the required accuracy and this can be accomplished only by means of special measuring instruments, which are highly expensive.

SUMMARY OF THE INVENTION

For this reason it is an object of the invention to eliminate said disadvantages and so to improve a method which is of the kind described first hereinbefore that the method can be carried out in a relatively simple manner and without a need for measuring equipment involving an excessively high expenditure.

This object is accomplished in accordance with the invention in that the required change of the position and/or mass distribution of the workpiece is determined in that in the total rotary unbalance of the workpiece, on the one hand, and the rotary unbalance which is due to those portions of the workpiece which are to be machined, on the other hand, are determined, and that the rotary unbalance which is due to those portions of the workpiece which are intended not to be machined is subsequently determined by a computation from the rotary unbalances which have previously been determined.

The total rotary unbalance of the workpiece can easily be determined in the usual manner by a dynamic method and virtually constitutes the starting point for the determination of the parameters to be taken into account in the balancing and centering operation. Because the machined portions of those portions of the workpiece which are to be machined have cylindrical surfaces, they can be measured by methods which are much simpler and less complicated than the methods which would be required for a measuring of the workpiece portions which are not intended to be machined and special equipment is not intended to be machined and special equipment is not required for that purpose because the measurement may be performed in the balancing and centering machine itself before the workpiece is gripped for the machining operation or may be performed outside the machine on a separate measuring bench. The total rotary unbalance and the rotary unbalance which is due to the portions which are to be machined can now be entered into a suitably programmed computer, in which said rotary unbalances are used for a computation of the rotary unbalance which is due to the remaining portions of the workpiece, which are not intended to be machined: That computed rotary unbalance will determine the required change of the position and/or mass distribution of the workpiece so that an optimum centering and preliminary balancing will be ensured and this can be performed in an economical and practical manner even on any conventional balancing and centering machine provided with a suitable computer.

BRIEF DESCRIPTION OF THE DRAWING

The drawing is a schematic side elevation showing partly in section a balancing and centering machine for carrying out the method in accordance with the invention.

DETAILED DESCRIPTION OF THE PREFERRED EMBODIMENT

A crankshaft K is to remain unmachined in the peripheral portions of the crankwebs W and is to be machined only at the mainshaft portions and crankpins Z and at the end portions E of the crankshaft. In order to simplify and improve the precision of the balancing operation to be performed after the machining operation, it is desired to effect a preliminary balancing of the crankshaft as it is being centered for being machined.

For that purpose a balancing and centering machine 1 is provided, which has gripping heads 3, which are mounted on and displaceable along a bed 2 of the machine and are provided with work holders 4, which are adapted to hold the workpiece K and are mounted to be rotatable and transversely displaceable by drive means, not shown. Two spindle units 5 are also longitudinally displaceable on the bed 2 and are disposed on those sides of the gripping heads 3 which are remote from each other. The spindle units 5 carry toolholders 6 for holding tools used to machine the workpiece K at its end faces and for drilling centering bores into the ends of the workpiece K. A work-handling device 7 is provided for inserting and removing a workpiece K into and from the work holders 4. A vertically movable work support 8 is provided and can be used to support the workpiece K before and after it is or has been fixed by the work holders 4 or during the measuring operation performed on the workpiece.

A measuring head 9 is provided for measuring the workpiece that is to be balanced and is preferably provided with light sources and sensors for generating measured-value signals. The measuring head 9 may be composed of a plurality of measuring units 9a so that the entire workpiece can be measured at one time, or may comprise only a single measuring unit 9a for measuring consecutive sections of length sections of the crankshaft K.

For a balancing centering operation the crankshaft K must be transversely displaced until its axis of rotation A, which is defined by centering bores drilled into the end faces of the crankshaft or by peripheral surfaces to be machined on the workpiece, is so arranged that the rotary unbalance which is due to the mass distribution of the crankshaft K when it has been machined will be minimized. For that balancing positioning of the axis of rotation of the crankshaft K, the latter is transversely displaced before the spindle units 5 drill the centering bores into the end faces of the workpiece and thus determine the actual axis of rotation A, which deviates from the theoretical axis of rotation of a hypothetical ideal workpiece. The magnitude and direction of the displacement of the workpiece are determined only by the rotary unbalance which is due to those portions of the workpiece which are not to be machined and consist of the crankwebs W whereas those workpiece portions which are to be machined and consist of the mainshaft sections and crankpins Z and the end portions E are not taken into account. It must be borne in mind that rotary unbalances which are due to said portions Z and E before they are machined will be eliminated during the final machining of the workpiece when it is centered on its axis of rotation A so that said rotary unbalance must not be taken into account in the balancing and centering of the workpiece before it is machined.

To permit a determination of the magnitude and direction of the transverse displacement to be imparted to the workpiece and to permit that displacement to be effected in an efficient manner, a dynamic unbalance detector, not shown, is used to determine the total rotary unbalance of the crankshaft K and corresponding data are entered into a computer, which is not shown too. The measuring head 9 is then used to measure those portions of the workpiece which are to be machined, i.e., the end portions E and the mainshaft sections and crankpins Z. This can be performed without difficulty because said portions are cylindrical. The data determined by said measurements are also entered into the computer and the latter now determines a rotary unbalance which is due to those portions W of the workpiece which are not intended to be machined. The latter rotary unbalance is determined by a computation from the previously determined rotary unbalances with reference to a hypothetical ideal crankshaft. That rotary unbalance determined by said computation will then determine the required displacement of the crankshaft and the computer will also be used to control the drives for the work holders 4.

I claim:

1. A method of centering and balancing an elongated workpiece having cylindrical portions to be machined while the workpiece is being rotated about an axis of rotation and eccentric portions remaining unmachined, the workpiece having a rotary unbalance, which comprises the steps of changing the position of the workpiece relative to the axis of rotation by a magnitude and in a direction which reduces the rotary unbalance of the workpiece and centers and balances the workpiece before the cylindrical portions are machined, determining the magnitude and direction of the workpiece position change only by the partial rotary unbalance due to the eccentric workpiece portions, deriving said partial rotary unbalance from a computation of the total rotary unbalance of the elongated workpiece, of the partial rotary unbalance due only to the cylindrical workpiece portions and by deducting the partial rotary balance due to the cylindrical workpiece portions from the total rotary unbalance, and subsequently gripping the elongated workpiece for machining of the cylindrical portions during rotation of the centered and balanced workpiece about the axis of rotation.

* * * * *